(12) United States Patent
Bagga et al.

(10) Patent No.: US 8,868,670 B2
(45) Date of Patent: Oct. 21, 2014

(54) METHOD AND APPARATUS FOR SUMMARIZING ONE OR MORE TEXT MESSAGES USING INDICATIVE SUMMARIES

(75) Inventors: Amit Bagga, Green Brook, NJ (US); Ani N. Nenkova, Seattle, WA (US)

(73) Assignee: Avaya Inc., Basking Ridge, NJ (US)

( * ) Notice: Subject to any disclaimer, the term of this patent is extended or adjusted under 35 U.S.C. 154(b) by 1153 days.

(21) Appl. No.: 10/833,261

(22) Filed: Apr. 27, 2004

(65) Prior Publication Data

US 2005/0262214 A1 Nov. 24, 2005

(51) Int. Cl.
*G06F 15/16* (2006.01)
*G06Q 10/10* (2012.01)
*G06F 17/27* (2006.01)
*G06F 17/30* (2006.01)
*G06F 17/22* (2006.01)

(52) U.S. Cl.
CPC .............. *G06Q 10/107* (2013.01); *G06F 17/27* (2013.01); *G06F 17/30684* (2013.01); *G06F 17/2247* (2013.01)
USPC ........................... 709/207; 709/206; 715/254

(58) Field of Classification Search
USPC .................. 709/206, 207; 715/514, 515, 516
See application file for complete search history.

(56) References Cited

U.S. PATENT DOCUMENTS

| | | | | |
|---|---|---|---|---|
| 5,077,668 A | * | 12/1991 | Doi | 715/206 |
| 5,297,027 A | * | 3/1994 | Morimoto et al. | 715/254 |
| 5,384,703 A | * | 1/1995 | Withgott et al. | 715/236 |
| 5,479,563 A | * | 12/1995 | Yamaguchi | 704/232 |
| 5,638,543 A | * | 6/1997 | Pedersen et al. | 704/1 |
| 5,754,938 A | * | 5/1998 | Herz et al. | 725/116 |
| 5,838,323 A | * | 11/1998 | Rose et al. | 715/236 |
| 5,907,841 A | * | 5/1999 | Sumita et al. | 1/1 |
| 5,924,108 A | * | 7/1999 | Fein et al. | 715/267 |
| 5,978,820 A | * | 11/1999 | Mase et al. | 715/210 |
| 6,289,304 B1 | * | 9/2001 | Grefenstette | 704/9 |
| 6,338,034 B1 | * | 1/2002 | Ishikawa et al. | 704/9 |
| 6,349,316 B2 | * | 2/2002 | Fein et al. | 715/267 |
| 6,370,525 B1 | * | 4/2002 | Kaufman | 707/730 |
| 6,377,949 B1 | * | 4/2002 | Gilmour | 1/1 |
| 6,424,362 B1 | * | 7/2002 | Bornstein et al. | 715/854 |
| 6,598,019 B1 | * | 7/2003 | Tokuda et al. | 704/255 |
| 6,651,059 B1 | * | 11/2003 | Sundaresan et al. | 1/1 |
| 6,683,940 B2 | * | 1/2004 | Contractor | 379/88.17 |

(Continued)

FOREIGN PATENT DOCUMENTS

JP 2002049632 A 2/2002

OTHER PUBLICATIONS

U.S. Appl. No. 10/833,262, filed Apr. 27, 2004.

(Continued)

*Primary Examiner* — Backhean Tiv (57) ABSTRACT

A method and apparatus are provided for summarizing a text message, such as an email message or a transcribed audio message. A portion of each text message, such as a sentence, is extracted as an indicative summary of the text message based on a degree of overlap of words in the sentence with a set of words, such as words in the message subject or words in a related root message. The extracted portion is based on a score for each portion of the text message, such as a sentence. An interface is also provided for presenting the indicative summaries of a set of related text messages to a user.

22 Claims, 4 Drawing Sheets

(56) References Cited

U.S. PATENT DOCUMENTS

| | | | |
|---|---|---|---|
| 6,816,885 B1* | 11/2004 | Raghunandan | 709/206 |
| 6,917,972 B1* | 7/2005 | Basko et al. | 709/224 |
| 6,990,634 B2* | 1/2006 | Conroy et al. | 715/227 |
| 7,006,968 B2* | 2/2006 | Norris et al. | 704/235 |
| 7,051,024 B2* | 5/2006 | Fein et al. | 1/1 |
| 7,092,993 B2* | 8/2006 | Goldberg | 709/206 |
| 7,277,887 B1* | 10/2007 | Burrows et al. | 1/1 |
| 7,299,261 B1* | 11/2007 | Oliver et al. | 709/206 |
| 7,366,711 B1* | 4/2008 | McKeown et al. | 1/1 |
| 7,392,474 B2* | 6/2008 | Chen et al. | 715/254 |
| 8,032,827 B2* | 10/2011 | Melander et al. | 715/234 |
| 2001/0049603 A1* | 12/2001 | Sravanapudi et al. | 704/270.1 |
| 2002/0078090 A1* | 6/2002 | Hwang et al. | 707/513 |
| 2002/0103836 A1* | 8/2002 | Fein et al. | 707/531 |
| 2002/0138528 A1* | 9/2002 | Gong et al. | 707/530 |
| 2002/0174149 A1* | 11/2002 | Conroy et al. | 707/531 |
| 2002/0178228 A1* | 11/2002 | Goldberg | 709/206 |
| 2003/0014400 A1* | 1/2003 | Siegel | 707/3 |
| 2003/0041126 A1* | 2/2003 | Buford et al. | 709/220 |
| 2003/0079185 A1* | 4/2003 | Katariya et al. | 715/530 |
| 2003/0099334 A1* | 5/2003 | Contractor | 379/88.13 |
| 2003/0101065 A1* | 5/2003 | Rohall et al. | 705/1 |
| 2003/0154254 A1* | 8/2003 | Awasthi | 709/206 |
| 2003/0158903 A1* | 8/2003 | Rohall et al. | 709/206 |
| 2003/0163537 A1* | 8/2003 | Rohall et al. | 709/206 |
| 2003/0167310 A1* | 9/2003 | Moody et al. | 709/206 |
| 2003/0195740 A1* | 10/2003 | Tokuda et al. | 704/1 |
| 2004/0113953 A1 | 6/2004 | Newman | |
| 2006/0206464 A1* | 9/2006 | Marukawa | 707/3 |
| 2006/0265666 A1* | 11/2006 | Bornstein et al. | 715/802 |
| 2008/0021969 A1* | 1/2008 | Oliver et al. | 709/206 |

OTHER PUBLICATIONS

A. Mikheev, "Learning Part-of-Speech Guessing Rules From Lexicon," Proc. of Coling 1996, 70-75 (1996).

G. A. Miller et al., "Introduction to WordNet: An On-Line Lexical Database," Int'l J. of Lexicography, 3(4) 235-312 (1990).

A. Nenkova et al., "Facilitating Email Thread Access by Extractive Summary Generation", RANLP 2003, Bulgaria (2003).

Hyam, Kristy, "CA Application No. 2,499,440 Office Action Nov. 27, 2008", , Publisher: CIPO, Published in: CA.

"EP Application No. 05251536.8 Office Action Apr. 4, 2007", , Publisher: EPO, Published in: EP.

Marcu, A., "EP Application No. 05251536.8 European Search Report Jun. 13, 2005", , Publisher: EPO, Published in: EP.

* cited by examiner

METHOD AND APPARATUS FOR SUMMARIZING ONE OR MORE TEXT MESSAGES USING INDICATIVE SUMMARIES

FIELD OF THE INVENTION

The present invention relates generally to techniques for summarizing textual messages, such as electronic mail messages, and more particularly, to methods and apparatus for summarizing such text messages using indicative summaries.

BACKGROUND OF THE INVENTION

Mailing lists and discussion groups are becoming increasingly popular and contain potentially useful information. Finding relevant information in such mailing lists or discussion groups, however, is generally quite difficult, since they generally provide little information about the information that is discussed in a given email thread. Thus, users are generally required to read most of the postings in a given thread to gain an understanding of the content. Typically, mailing list archives are represented as a sequence of the threads in the archive, where each thread is shown as an indented list with subject lines and related information, such as the name of the sender, the time of posting and the number of follow-ups for the message. Even when the subject of the initial posting (root) of the thread is well chosen and informative, the indented representation is generally not very helpful since the subjects of all follow-up messages simply repeat the original subject.

A hierarchical listing of such archives provides a first level representation containing the subject of the first email in each thread (the root email) and the number of postings in the thread. When a user selects a particular thread or subject, the second level representation of the selected thread is shown in a new window where the messages can be opened and viewed one at a time. The introduction of this second level allows the user to quickly skim through the initial subject lines and determine if there is a topic of interest to read. Even when the subject for the initial posting is well-chosen, however, it can rarely give the user a good description of what is being discussed.

Google groups further improve on such hierarchical listings by using a two-level representation. The first level is similar to the first level in the hierarchical listings and indicates the date of posting, the subject of initial email in the thread, the name of the most recent poster and the number of messages in the thread. The second level consists of a two frame page showing the indented structure and a digest of the messages on one screen. The digest consists of the concatenated bodies of the first ten messages posted in the thread. While the representation employed by Google groups allows a user to more easily find topics of interest, the user must still browse the digests containing actual content of each thread.

A need therefore exists for methods and apparatus for generating thread overviews that serve as indicative summaries for the thread. A further need exists for a more efficient representation that allows a user to determine which threads to read without browsing the actual content of the thread.

SUMMARY OF THE INVENTION

Generally, a method and apparatus are provided for summarizing a text message, such as an email message or a transcribed audio message. A portion of each text message, such as a sentence, is extracted as an indicative summary of the text message based on a degree of overlap of words in the sentence with a set of words. The set of words may be the words in the subject associated with the text message or the words in a root message associated with the text message. A portion of each text message can be extracted for each of a plurality of text messages in a thread. The extracted portions of each text message for each of a plurality of text messages in a thread can be presented as an indicative summary of the entire thread.

According to a further aspect of the invention, the extracted portion is based on a score for each portion of the text message, such as a sentence. In one implementation, the score for a sentence in a root message is based on an overlap between certain word types in each sentence in the root message and a subject of the root message. The score for each sentence of a follow-up message is based on an overlap between certain word types in each sentence in the follow-up message and the root message.

According to another aspect of the invention, an interface is provided for presenting the summaries generated in accordance with the present invention to a user. For example, a web-based interface can present the extracted indicative summaries for each text message in a thread to a user using a web-based interface that can be accessed over a network, such as the Internet. In a further variation, an audio interface can be provided, for example, as part of a voice mail system, where the extracted indicative summaries are converted to speech and presented in audio form. A more complete understanding of the present invention, as well as further features and advantages of the present invention, will be obtained by reference to the following detailed description and drawings.

DETAILED DESCRIPTION

The present invention provides methods and apparatus for summarizing one or more text messages (including transcribed audio messages), such as a related set of email or voice mail exchanges, using an indicative summary. The indicative summary is obtained by extracting a representative sentence from each text message that represents the content of the text. Unlike newswire content, the first sentence in an email can often be a greeting, quote from a previous message or header information, and therefore the first sentence may not be informative. While informative summaries are intended to serve as a surrogate for the original document(s), the indicative summaries employed by the present invention aim to provide an idea about what is discussed in the document(s) rather than providing a substitution for the original content. Generally, the indicative summary allows the user to decide if the document(s) are worth retrieving and reading.

In one exemplary embodiment, an overview of a thread of email messages is generated that provides an indication of what is being discussed in the email thread. The thread overviews contain an extractive summary for the documents. The overviews are relatively short and the user can skim through them in order to find threads of interest. While the present invention is illustrated in the context of such mailing lists and mail-based discussion groups, the present invention can be applied to summarize any textual messages, as would be apparent to a person of ordinary skill in the art.

Figure 1:
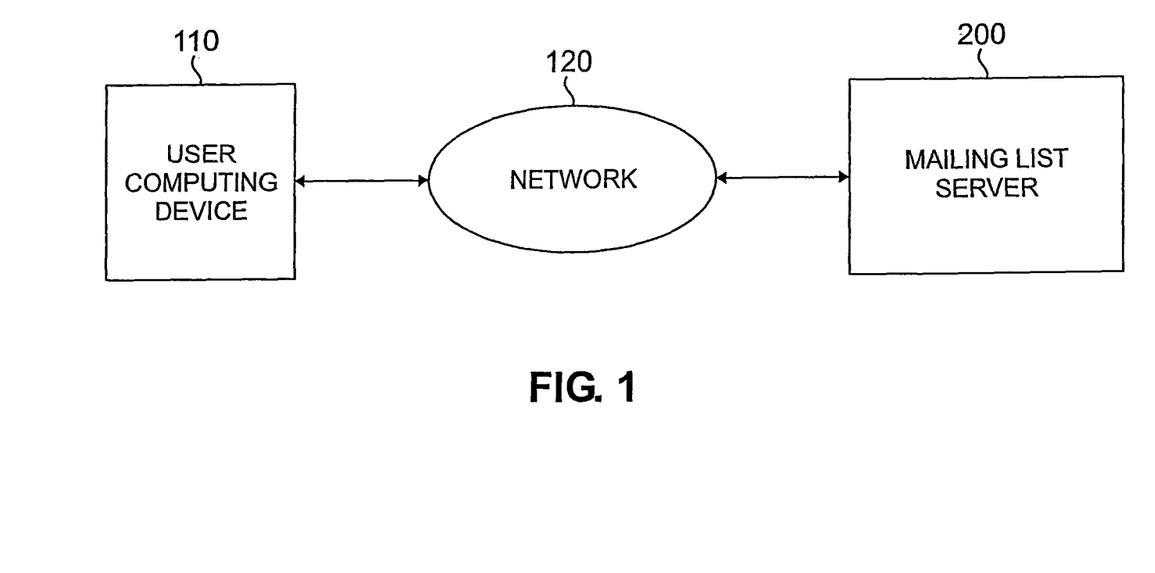
FIG. 1 illustrates a network environment in which the present invention can operate.

FIG. 1 illustrates an exemplary network environment in which the present invention can operate. As shown in FIG. 1, a user employing a computing device 110, contacts a mailing list server 200, discussed below in conjunction with FIG. 2, over a network 120. The mailing list server 200 provides, for example, a mailing list or mail-based discussion group. The network 120 may be embodied as any private or public wired or wireless network, including the Public Switched Telephone Network, a Private Branch Exchange switch, Internet, or cellular network, or some combination of the foregoing. While the present invention is illustrated using a server side implementation, where the features of the present invention are resident on the mailing list server 200, the features and functions of the present invention may be deployed on a number of distributed servers 200, as well as on a client associated with the user computing device 110, or a combination of the foregoing, as would be apparent to a person of ordinary skill in the art.

Figure 2:
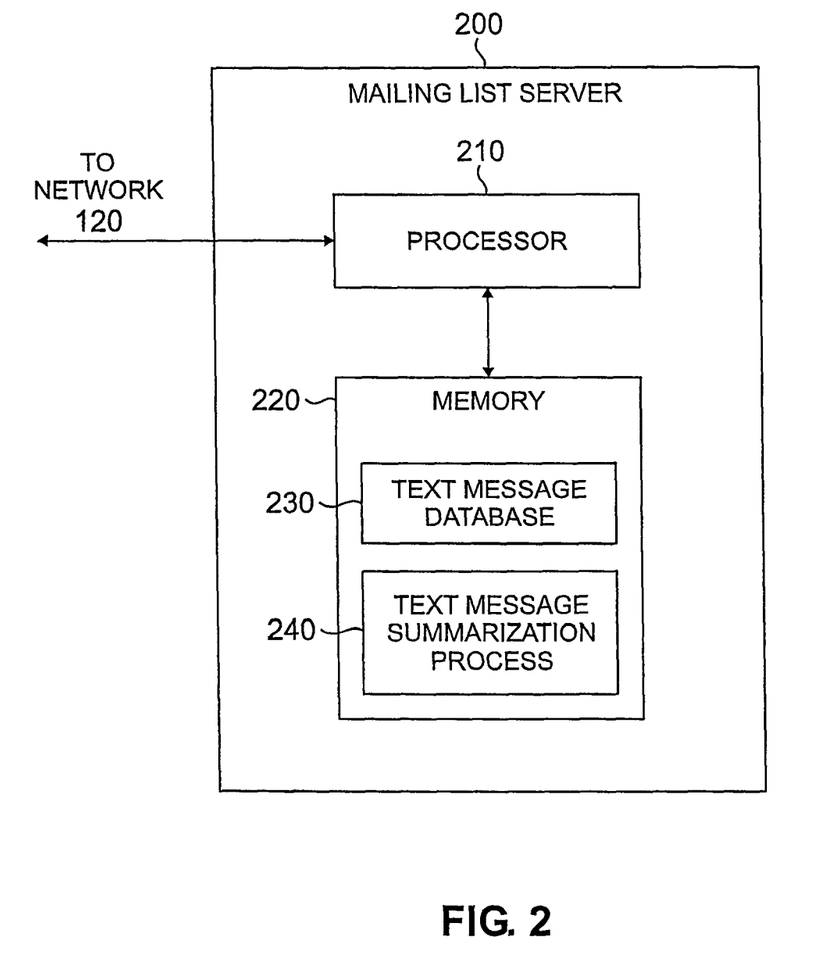
FIG. 2 is a schematic block diagram of an exemplary mailing list server incorporating features of the present invention.

FIG. 2 is a schematic block diagram of an exemplary mailing list server 200 incorporating features of the present invention. The mailing list server 200 may be any computing device, such as a personal computer, work station or server. As shown in FIG. 2, the exemplary mailing list server 200 includes a processor 210 and a memory 220, in addition to other conventional elements (not shown). The processor 210 operates in conjunction with the memory 220 to execute one or more software programs. Such programs may be stored in memory 220 or another storage device accessible to the mailing list server 200 and executed by the processor 210 in a conventional manner.

For example, the memory 220 may store a text message database 230 and a text message summarization process 400, discussed below in conjunction with FIG. 4. Generally, the text message database 230 contains one or more text messages that are processed by the text message summarization process 400 in accordance with the present invention to obtain an indicative summary of one or more messages in the text message database 230.

In an exemplary implementation, the text message database 230 contains a collection of text messages, referred to as the Pine-Info mailing list (www.washington.edu/pine/pine-info/). The Pine-Info mailing list comprises a list of email messages regarding features, bugs and other issues related to the Pine software. The discussion in the mailing list is generally focused and is oriented towards solving problems related to the Pine software. It is noted that text messages can be processed by the present invention in real time as they are received, and need not be obtained from a database 230 of such text messages.

Figure 3:
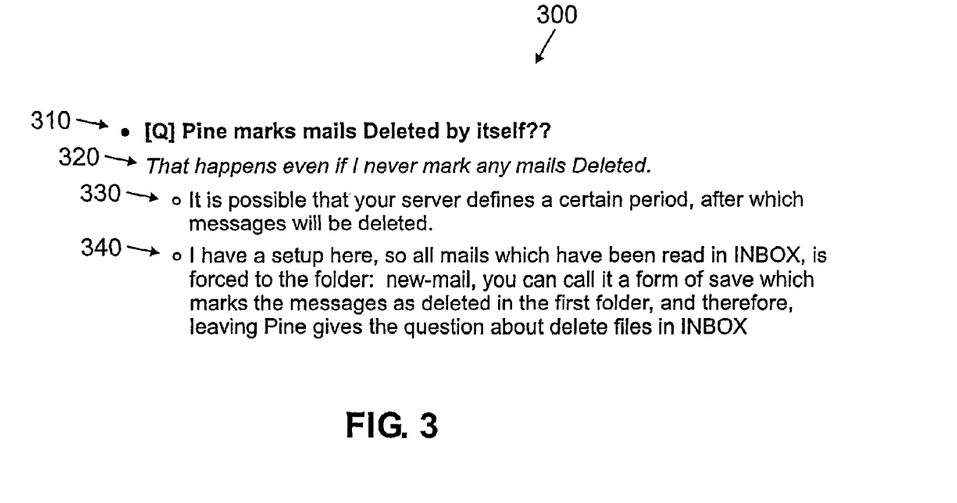
FIG. 3 illustrates an exemplary thread overview incorporating features of the present invention.

FIG. 3 illustrates an exemplary thread overview 300 incorporating features of the present invention. The exemplary thread overview 300 is generated by the text message summarization process 400 in a manner described further below. As shown in FIG. 3, the exemplary thread overview 300 includes an indication 310 of the original subject of the initial posting (i.e., root) of the thread, as provided by the creator of the initial posting, an indicative summary 320 of the initial posting in accordance with the present invention, and optionally indicative summaries 330, 340 of one or more follow up email messages to the initial posting. Thus, as discussed below in conjunction with FIG. 4, the text message summarization process 400 extracts one representative sentence 320 from an initial email in a thread and one representative sentence 330, 340 from one or more follow-up emails to the initial posting. As shown in FIG. 3, the one or more indicative summaries 320, 330, 340 can be displayed along with the subject 310 of the initial posting to provide an indication of the problem discussed.

Generating Thread Overviews

As previously indicated, the present invention generates an indicative summary representation of a one or more text messages, such as an email thread, by extracting, from each email in the thread, a representative sentence that provides an indication of the email content. In one variation of the invention, a further reduction in the information presented in the exemplary thread overview 300 can be made by extracting a representative sentence from only the thread root message and the first N follow-up email messages. When the text message database 230 is comprised of messages related to problem solving issues, for example, the extracted sentences should contain a statement of the problem and a suggestion for its solution. In this manner, the user obtains sufficient information on the topic of the thread so that the user can decide if he or she should read the entire thread.

Figure 4:
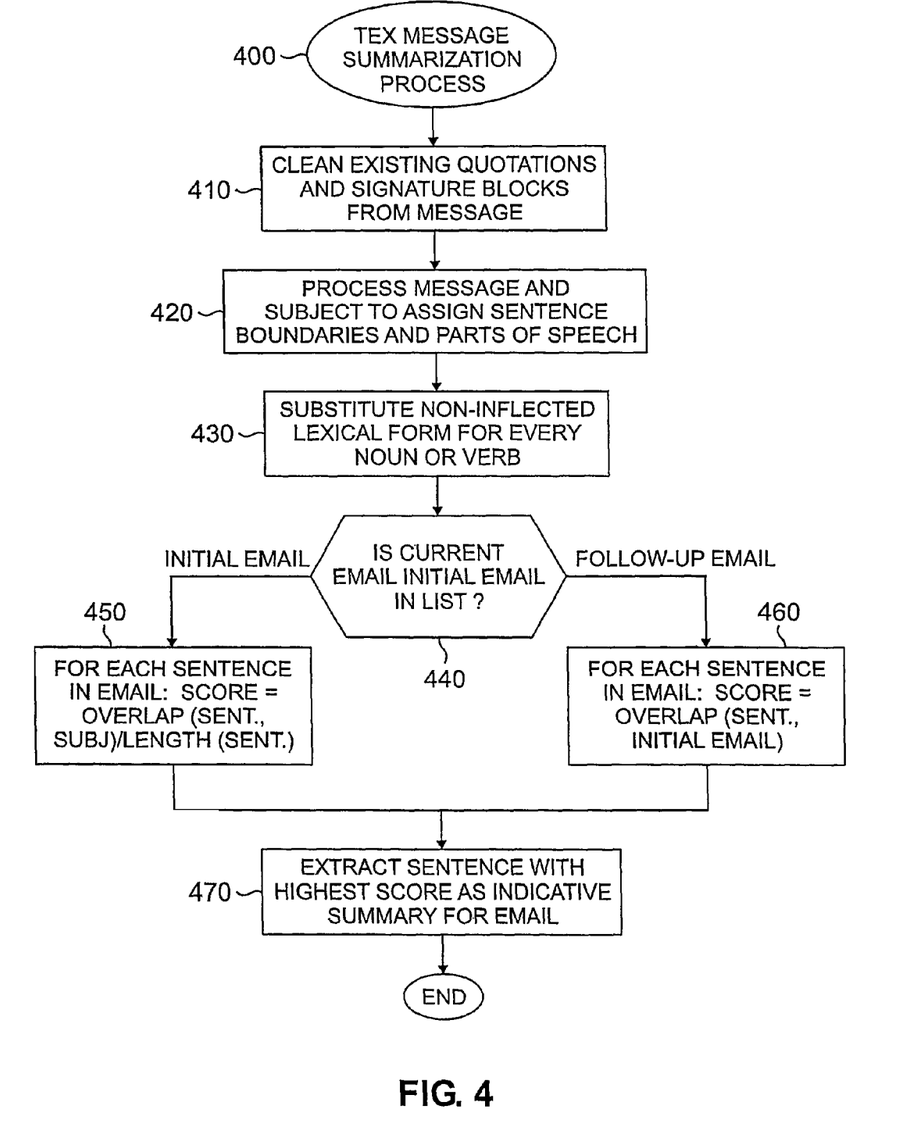
FIG. 4 is a flow chart describing an exemplary implementation of a text message summarization process incorporating features of the present invention.

FIG. 4 is a flow chart describing an exemplary implementation of a text message summarization process 400 incorporating features of the present invention. The exemplary embodiment of the text message summarization process 400 recognizes that initial postings generally have well-chosen subjects. Thus, in order to find the sentence in the root email that provides a good indication of the problem, rather than background or introduction information, the text message summarization process 400 finds the shortest sentence in the email that has the largest overlap of certain word types, such as nouns, verbs, adjectives and adverbs, with the subject of the message.

As shown in FIG. 4, the text message summarization process 400 optionally performs preprocessing steps on the one or more email messages during steps 410 through 430. Initially, the text message summarization process 400 removes any existing quotations or signature blocks from the email message(s) during step 410. Thereafter, the text message summarization process 400 processes the email message and subject during step 420 to assign sentence boundaries and parts of speech to each word in the email message. For example, the message and its subject can be processed with the LT POS tool, described in A. Mikheev, "Learing Part-of-Speech Guessing Rules From Lexicon," Proc. of COLING 1996, 70-75 (1996), incorporated by reference herein. Finally, the non-inflected lexical form (i.e., the root form) is substituted for every noun or verb in the email during step 430. For example, the non-inflected lexical form for each noun and verb can be obtained from the WordNet dictionary, described, for example, in G. A. Miller et al., "Introduction to WordNet: An On-Line Lexical Database," Int'l J. of Lexicography, 3(4) 235-312 (1990), incorporated by reference herein.

A test is then performed during step 440 to determine if the current email being processed is a root email (or a single email) or a follow-up email. Root mails can be distinguished, for example, in accordance with the techniques described in U.S. patent application entitled "Method and Apparatus for Classification of Relative Position of One or More Text Messages in an Email Thread," filed contemporaneously herewith and incorporated by reference herein. If it is determined during step 440 that the current email is a root email, then each sentence in the root email is assigned a score during step 450. Generally, the score computed during step 450 computes the overlap between certain word types in each sentence in the email and the subject. In particular, each sentence is assigned a score in the exemplary embodiment equal to $\text{overlap}_{subj}/\text{length}_{sent}$, where $\text{overlap}_{subj}$ is the overlap of the noninflected forms of verbs, nouns, adjectives and adverbs (e.g., the most information bearing word types) in the subject and the sentences (i.e., the number of such words occurring in both the sentence and the subject line of initial posting), and $\text{length}_{sent}$ is the number of words with such parts of speech in the scored sentence. In the case of a tie, the sentence with the highest score that appears first in the body of the message can be chosen. The sentence with the highest score is extracted during step 470 as the indicative summary for the email. The optional normalization to sentence length was aimed at selecting shorter sentences, as long sentences are not easy to skim and the probability of larger overlap is naturally higher.

If, however, it is determined during step 440 that the current email is a follow-up email, then each sentence in the follow-up email is assigned a score during step 460. For follow-up emails, the exemplary embodiment of the text message summarization process 400 computes the overlap in terms of verbs and nouns between the root message and each of the sentences of the follow-up message. For each sentence in the follow-up email, a weight is computed during step 460 equal to the overlap of nouns and verbs between the entire root email and the sentence. The sentence with highest score is extracted during step 470 as an indicative summary for the follow-up message. Again, ties can be decided, for example, by giving preference to the sentence with the highest score that appears earliest in the message.

Thus, the root message is taken as background and the sentence most relevant to the background in the follow-up is extracted. This approach helps make the overviews more cohesive as it ensures that the subjects of the follow-ups are related to the subject of the root.

The approach described in FIG. 4 can be generalized for messages deeper in the discussion tree. In this case, the background is taken to be the concatenation of all the messages preceding the currently processed mail up to the root. Once again, the sentence with highest score is the sentence with highest overlap of nouns and verbs.

According to another aspect of the invention, an interface is provided for presenting the summaries generated in accordance with the present invention to a user. For example, a web-based interface can present the extracted indicative summaries for each text message in a thread to a user using a web-based interface that can be accessed over a network, such as the Internet. In a further variation, an audio interface can be provided, for example, as part of a voice mail system, where the extracted indicative summaries are converted to speech and presented in audio form.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   receiving, at a server, a message comprising a subject, a first sentence and a second sentence;
   processing the message to yield a processed subject based on the subject, a processed first sentence based on the first sentence, and a processed second sentence based on the second sentence, wherein processing the message comprises identifying words in the message that are of a predefined word type; and
   selecting exactly one of the first sentence or the second sentence as a summary text, which summarizes the message, based on:
   (i) a first number of words of the predefined word type in the processed first sentence;
   (ii) a second number of words of the predefined word type in the processed second sentence;
   (iii) first overlapping words, of the predefined word type, occurring both in the processed subject and the processed first sentence; and
   (iv) second overlapping words, of the predefined word type, occurring both in the processed subject and the processed second sentence.

2. The method of claim 1, wherein the summary text is a first summary text, and wherein processing the message further yields a processed message based on the message, the method further comprising:
   receiving a follow-up message to the message, the follow-up message comprising a third sentence and a fourth sentence;
   processing the follow-up message to yield a processed third sentence based on the third sentence and a processed fourth sentence based on the fourth sentence; and
   selecting only one of the third sentence or the fourth sentence as a second summary text, which summarizes the follow-up message, based on:
   (i) third overlapping words, of the predefined word type, occurring both in the processed message and the processed third sentence; and
   (ii) fourth overlapping words, of the predefined word type, occurring both in the processed message and the processed fourth sentence.

3. The method of claim 1, wherein the predefined word type comprises an information-bearing word type.

4. The method of claim 3, wherein the information-bearing word type comprises one of verbs, nouns, adjectives, or adverbs.

5. The method of claim 1, further comprising selecting exactly one of the first sentence or the second sentence for each of a plurality of messages.

6. The method of claim 5, wherein the plurality of messages is a message thread.

7. The method of claim 1, wherein processing the message further comprises substituting a word in the message with a non-inflected lexical form of the word.

8. The method of claim 1, wherein selecting the exactly one of the first sentence or the second sentence is further based on:
- (v) a third number of the first overlapping words; and
- (vi) a fourth number of the second overlapping words.

9. The method of claim 8, wherein selecting the exactly one of the first sentence or the second sentence comprises:
- computing a first score for the first sentence, the first score equaling the third number divided by the first number;
- computing a second score for the second sentence, the second score equaling the fourth number divided by the second number;
- when the first score is higher than the second score, selecting the first sentence as the summary text; and
- when the second score is higher than the first score, selecting the second sentence as the summary text.

10. The method of claim 1, wherein processing the message further comprises removing one of a quotation or a signature block from the message.

11. The method of claim 1, wherein the message is a transcribed audio message.

12. A system comprising:
- a processor;
- a computer-readable storage medium storing instructions which, when executed by the processor, cause the processor to perform operations comprising:
  - receiving a message comprising a subject, a first sentence and a second sentence;
  - processing the message to yield a processed subject based on the subject, a processed first sentence based on the first sentence, and a processed second sentence based on the second sentence, wherein processing the message comprises identifying words in the message that are of a predefined word type; and
  - selecting exactly one of the first sentence or the second sentence as a summary text, which summarizes the message, based on:
    - (i) a first number of words of the predefined word type in the processed first sentence;
    - (ii) a second number of words of the predefined word type in the processed second sentence;
    - (iii) first overlapping words, of the predefined word type, occurring both in the processed subject and the processed first sentence; and
    - (iv) second overlapping words, of the predefined word type, occurring both in the processed subject and the processed second sentence.

13. The system of claim 12, wherein the summary text is a first summary text, wherein processing the message further yields a processed message based on the message, and wherein the computer-readable storage medium stores additional instructions which, when executed by the processor, perform further operations comprising:
- receiving a follow-up message to the message, the follow-up message comprising a third sentence and a fourth sentence;
- processing the follow-up message to yield a processed third sentence based on the third sentence and a processed fourth sentence based on the fourth sentence; and
- selecting only one of the third sentence or the fourth sentence as a second summary text, which summarizes the follow-up message, based on:
  - (i) third overlapping words, of the predefined word type, occurring both in the processed message and the processed third sentence; and
  - (ii) fourth overlapping words, of the predefined word type, occurring both in the processed message and the processed fourth sentence.

14. The system of claim 12, wherein the predefined word type comprises an information-bearing word type.

15. The system of claim 14, wherein the information-bearing word type comprises one of verbs, nouns, adjectives, or adverbs.

16. The system of claim 12, wherein the computer-readable storage medium stores additional instructions which, when executed by the processor, perform further operations comprising selecting exactly one of the first sentence or the second sentence for each of a plurality of messages.

17. The system of claim 16, wherein the plurality of messages is a message thread.

18. The system of claim 12, wherein processing the message further comprises substituting a word in the message with a non-inflected lexical form of the word.

19. The system of claim 12, wherein selecting the exactly one of the first sentence or the second sentence is further based on:
- (v) a third number of the first overlapping words;
- (vi) a fourth number of the second overlapping words.

20. The system of claim 19, wherein selecting the exactly one of the first sentence or the second sentence comprises:
- computing a first score for the first sentence, the first score equaling the third number divided by the first number;
- computing a second score for the second sentence, the second score equaling the fourth number divided by the second number;
- when the first score is higher than the second score, selecting the first sentence as the summary text; and
- when the second score is higher than the first score, selecting the second sentence as the summary text.

21. The system of claim 20, wherein processing the message further comprises removing one of a quotation or a signature block from the message.

22. A computer-readable storage device storing instructions which, when executed by a processor, to cause the processor to perform operations comprising:
- receiving, at a server, a message comprising a subject, a first sentence and a second sentence;
- processing the message to yield a processed subject based on the subject, a processed first sentence based on the first sentence, and a processed second sentence based on the second sentence, wherein processing the message comprises identifying words in the message that are of a predefined word type; and
- selecting exactly one of the first sentence or the second sentence as a summary text, which summarizes the message, based on:
  - (i) a first number of words of the predefined word type in the processed first sentence;
  - (ii) a second number of words of the predefined word type in the processed second sentence;

(iii) first overlapping words, of the predefined word type, occurring both in the processed subject and the processed first sentence; and
(iv) second overlapping words, of the predefined word type, occurring both in the processed subject and the processed second sentence.

\* \* \* \* \*